(12) United States Patent
Albouyeh et al.

(10) Patent No.: US 10,454,865 B2
(45) Date of Patent: Oct. 22, 2019

(54) SOCIAL NETWORK ACTIVITY MODES

(71) Applicant: International Business Machines Corporation, Armonk, NY (US)

(72) Inventors: Shadi E. Albouyeh, Raleigh, NC (US); Bernadette A. Carter, Raleigh, NC (US); Jeffrey R. Hoy, Southern Pines, NC (US); Stephanie L. Trunzo, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 579 days.

(21) Appl. No.: 14/578,282

(22) Filed: Dec. 19, 2014

(65) Prior Publication Data

US 2016/0182419 A1  Jun. 23, 2016

(51) Int. Cl.
*H04L 12/58*  (2006.01)

(52) U.S. Cl.
CPC .............. *H04L 51/12* (2013.01); *H04L 51/32* (2013.01)

(58) Field of Classification Search
CPC ................................ H04L 51/12; H04L 51/32
See application file for complete search history.

(56) References Cited

U.S. PATENT DOCUMENTS

| | | | |
|---|---|---|---|
| 5,917,489 A * | 6/1999 | Thurlow | G06Q 10/107 706/45 |
| 7,669,123 B2 | 2/2010 | Zuckerberg et al. | |
| 8,443,290 B2 | 5/2013 | Bill | |
| 2003/0009698 A1 * | 1/2003 | Lindeman | H04L 12/585 726/4 |
| 2007/0255785 A1 | 11/2007 | Hayashi et al. | |
| 2009/0082038 A1 | 3/2009 | McKiou et al. | |
| 2011/0004831 A1 * | 1/2011 | Steinberg | H04N 21/454 715/753 |
| 2011/0137845 A1 | 6/2011 | Ward | |
| 2011/0167115 A1 | 7/2011 | Gilbert et al. | |
| 2012/0296919 A1 | 11/2012 | Sinha et al. | |
| 2016/0026643 A1 * | 1/2016 | Desai | G06F 17/3053 707/727 |

OTHER PUBLICATIONS

Microsoft Office Outlook 2003 step by step. Redmond, Wash: Microsoft Press, 2004. Accessed online via Safari Books online. (Chapter 3 attached) (Year: 2004).*
Author Unknown, Attitudinal Filter for Social Media Posts, IP Disclosure No. IPCOM000218944D, Ip.com, Jun. 12, 2012, pp. 1-2, Published online at: http://ip.com/IPCOM/000218944.

* cited by examiner

*Primary Examiner* — Tonia L Dollinger
*Assistant Examiner* — Albert Chiou
(74) *Attorney, Agent, or Firm* — Lee Law, PLLC; Christopher B. Lee

(57) ABSTRACT

A social network activity mode that is implemented using social network activity rules is identified. The social network activity rules allow only social network posts of relevance to a particular activity of a user to be presented to the user. The social network activity mode is applied to a group of social network posts. Based upon applying the social network activity mode to the group of social network posts, social network posts that comply with the social network activity rules of the social network activity mode are provided to the user and social network posts that do not comply with the social network activity rules of the social network activity mode are blocked.

20 Claims, 6 Drawing Sheets

SOCIAL NETWORK ACTIVITY MODES

BACKGROUND

The present invention relates to social network content streams. More particularly, the present invention relates to social network activity modes.

Social networks allow users to connect and communicate to create a shared user experience. A social network user may post messages to the social network, and other social network contacts of the social network user may view the posted messages. Social network users may also post photographs, and comment on other social network users' posted messages.

BRIEF SUMMARY

A method includes identifying, via a processor, a social network activity mode implemented using social network activity rules that allow only social network posts of relevance to a particular activity of a user to be presented to the user; applying the social network activity mode to a plurality of social network posts; and based upon applying the social network activity mode to the plurality of social network posts, both of: providing social network posts that comply with the social network activity rules of the social network activity mode to the user; and blocking social network posts that do not comply with the social network activity rules of the social network activity mode.

A system includes a memory; and a processor programmed to: identify, within the memory, a social network activity mode implemented using social network activity rules that allow only social network posts of relevance to a particular activity of a user to be presented to the user; apply the social network activity mode to a plurality of social network posts; and based upon applying the social network activity mode to the plurality of social network posts, both of: provide social network posts that comply with the social network activity rules of the social network activity mode to the user; and blocking social network posts that do not comply with the social network activity rules of the social network activity mode.

A computer program product includes a computer readable storage medium having computer readable program code embodied therewith, where the computer readable program code when executed on a computer causes the computer to: identify a social network activity mode implemented using social network activity rules that allow only social network posts of relevance to a particular activity of a user to be presented to the user; apply the social network activity mode to a plurality of social network posts; and based upon applying the social network activity mode to the plurality of social network posts, both of: provide social network posts that comply with the social network activity rules of the social network activity mode to the user; and block social network posts that do not comply with the social network activity rules of the social network activity mode.

DETAILED DESCRIPTION

Figure 1:
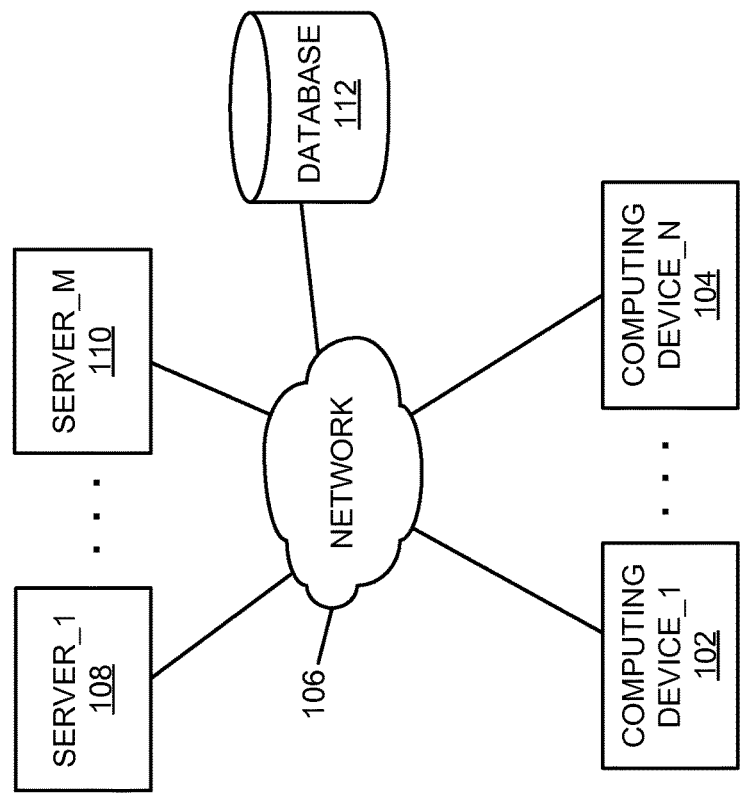
FIG. 1 is a block diagram of an example of an implementation of a system for social network activity modes according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides social network activity modes. The technology described herein solves a problem that has been identified within social networks related to a lack of content control by the social network users themselves. It was recognized that other users may post content and this content will be published to all social network contacts of the posting user. However, it was also recognized that other contacts of posting users may prefer not to receive or may prefer to delay review of certain types of posts, such as work-related posts or posts that may discuss controversial topics (e.g., news, politics, etc.) from any content source while they are, for example, out of the office or on vacation. The present technology described herein solves this recognized problem by allowing users to define their own content management or activity modes that control what content is provided to the user at times during which the user-defined activity modes are active. The present technology provides an option to save the content that is blocked for later review.

The present technology operates by identifying a social network activity mode that is implemented using social network activity rules. The social network activity rules allow only social network posts of relevance to a particular activity of a user to be presented to the user. The social network activity mode is applied to social network posts. Only social network posts that comply with the social network activity rules of the social network activity mode are provided to the user, while social network posts that do not comply with the social network activity rules of the social network activity mode may be blocked.

As an alternative to blocking posts that do not comply with the social network activity modes, the social network activity modes may implement prioritization of social network posts and may prioritize posts that comply with the social network activity rules of the social network activity mode and deprioritize posts that do not comply with the social network activity rules of the social network activity mode. As such, rather than implementing a strict show/no-show filter based upon the social network activity modes, content that does not comply with the social network activity rules of the social network activity mode may be placed at a lower location on a post viewing page. This form of strategic prioritization of compliant posts relative to non-compliant posts allows users to selectively scroll to and view the deprioritized posts if the user is interested in viewing posts other than those that are related to their active social network activity mode(s).

The remainder of the description herein primarily utilizes terminology of the initial implementation described above for purposes of example, where only social network posts that comply with the social network activity rules of the social network activity mode are provided to the user, while social network posts that do not comply with the social network activity rules of the social network activity mode may be blocked. However, it is understood that the description and examples that follow equally describe the second implementation described above, where posts that comply with the social network activity rules of the social network activity mode are prioritized relative to posts that do not comply with the social network activity rules of the social network activity mode, and that any differences in terminology between the two primary implementation options are omitted in favor of clarity of description.

As such, the present technology provides a new capability of a social network activity "mode." The social network modes include a set of social network rules that may be temporarily applied to one or more content streams to filter or delay content delivery to a user. The activity modes and the underlying social network rules may be built into the social network system/platform, and an activity rules engine may be built into a user computing device or may be provided within the social network. Additionally, activity mode templates may be provided within the social network, and the activity modes and the underlying social network rules may be customized to define user-specific activity modes based on a set of filters. As another alternative, using the underlying infrastructure in place within the social network platform, users may fully define activity rules that comply with the activity rule engine interface without use of a template.

For example, the present technology allows users to specify their own user-defined activity modes, such as a "vacation" activity mode, that may be active when a user is on vacation. This mode may allow the user to stay up-to-date on their personal social network activity streams while on vacation while providing the user with only positive content and updates from family. Negative content from any content source may be blocked (or deprioritized) while in the vacation mode so that the user may enjoy the vacation time without having unrelated concerns imposed upon them by the social network. Similarly, the user may specify a "work" activity mode that provides only work-related content from any content source during work hours (or that deprioritizes non-work-related content, such as personal content). Further, the user may specify a "personal" mode that provides only non-work-related content from any content source during non-work hours (or that deprioritizes work-related content). Other activity modes may include a "social" activity mode, a "political" activity mode, an "age group-related" activity mode, a "positive" activity mode, a "negative" activity mode, an "optimistic" activity mode, etc. The present technology provides a technological foundation upon which users may define activity modes that are relevant to them and their interests during multiple different user activities. Many other social network activity modes are possible and all such modes are considered to be within the scope of the present technology.

Another technical feature of the present technology is integration of the social network activity mode capability with user applications to automatically set the network activity mode for the user based upon the application and/or data within the application. For example, a user may integrate their calendar application with the social network to show that the user is on vacation, and the social network may then automatically enter a "vacation mode" during that calendared time period. Alternatively, the user may integrate the "vacation mode" with a global positioning system (GPS) application of a GPS-capable smartphone to activate the vacation mode when the user is near a vacation destination (e.g., a beach, mountains, etc.).

Activity mode suggestions may also be provided to the user, and the user may accept or decline the suggested mode, or may further define and/or customize the suggested activity mode to tailor the user's social network experience to their contemporaneous preferences for content. The social network activity rules engine may analyze the text of content the user reads and/or writes to suggest an appropriate activity mode to the user. For example, if a user typed "going on vacation!" in their status message to their contacts, the social network activity rules engine may compare the status text to available mode titles. The social network activity rules engine may recognize that a mode titled "vacation mode" is defined for the user and offer to activate the vacation mode for the user. Additionally, where a user has selected and read only messages about an upcoming election, the social network activity rules engine may offer to activate a "politics mode" with related political filter rules.

Additionally, activity modes may be automatically generated for a user based upon user behavior/activities. For example, where a user always views the news-related streams, but skips updates from contacts other than family members on a weekend, a behavior-based activity mode may be created for the user.

Activity modes may also be suggested by other sources/entities, such as campaigns (e.g, social issue campaigns, nature preservation campaigns, political campaigns, etc.). For example, a campaign organization may send an activity mode suggestion button, such as "click here to activate our campaign mode," and an associated activity mode may be activated for the user responsive to a user selection of the activity mode suggestion button.

Multiple modes may be simultaneously activated for inclusive or exclusive content blocking (or deprioritizing). For example, the user may choose to create a union of content from multiple sources that allows all content from the sources to be displayed. Alternatively, the user may choose to create an intersection of content from multiple sources that allows only content that matches filter criteria of every source to be displayed, and that excludes content that does not meet the criteria of every source. Logical operators may be used to combine different activity modes as unions or intersections.

For example, logical criteria may be combined to implement complex activity rules, such as a set of criteria specified as: "a content attitude of the post is positive "AND" the content text contains any of the keywords defined by the user "OR" the content posting entity is a family member." Within this example, all content from a family member will be provided to the user, but other posts will be limited to positive attitude posts that include specific keywords defined by the user (e.g., beach, sun, travel, fun, hiking, etc.). In this way, the user may categorically include or exclude posts based upon both the content of the post and the originating entity of a post.

Using the multi-mode features of the present technology, users may build new combined activity modes based upon other existing or user-defined social network activity modes. For example, a user may construct a "working-vacation mode" from a work mode and a vacation mode. Again, the user may apply inclusive or exclusive content filtering.

Users may also share custom-built activity modes with other users. For example, users may publish their activity modes within a social network and provide a link to the published activity modes to other users. The other users may review the activity mode, and reuse the activity mode created by another user as published, or may augment the published activity mode for their own preferences. The augmented activity mode may also be published, and a link to that published activity mode may be provided to the original activity mode creator and to other users. As such, an increasing set of social network activity modes may be created and shared within a social network.

Users may also search for published activity modes based on keywords or criteria. Users may enter search criteria related to their intended activity, and may receive links to published activity modes that satisfy the search criteria. Again, the user may use one of the existing activity modes as published, or the user may augment an existing activity mode and republish it to create a new user-defined activity mode to share within a social network.

The matching of activity modes to content may be performed using text analytics, content tagging, or other content processing as appropriate for a given implementation. Tagging of the activity modes may also be used to match modes with general content-based tags.

It should be noted that conception of the present subject matter resulted from recognition of certain limitations associated with social network activity streams. For example, it was observed that activity streams in social networks make use of an increasing number of content source types, including friend status updates, updates from coworkers, news feeds, political communications, business marketing, coupons, and other forms of content sources. It was further recognized that, while certain operations within social networks may be performed to limit a number/quantity of posts received, these operations employ an all-or-nothing approach that is applied to a particular content source without any consideration for the content of the respective posts. As such, it was determined that existing social network technology does not provide a way for a user to control their own content stream filtering preferences based upon the user's own activities. The present subject matter improves social network content control by users by providing for social network activity modes, as described above and in more detail below. As such, improved social network relevancy of content provided to users based upon the user's activities may be obtained through use of the present technology.

The social network activity modes described herein may be performed in real time to allow prompt definition and implementation of different modes of social network content filtering based upon activities of a social network user. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for social network activity modes. A computing device_1 102 through a computing device_N 104 communicate via a network 106 with several other devices. The other devices include a server_1 108 through a server_M 110, and a database 112. Any of the computing device_1 102 through the computing device_N 104 and/or the server_1 108 through the server_M 110 may implement an activity rules engine to process the social network activity modes described herein. The database 112 may store activity rule templates, configured user-specific activity rules, social network content, and other information as appropriate for a given implementation.

As will be described in more detail below in association with FIG. 2 through FIG. 4C, the computing device_1 102 through the computing device_N 104 and the server_1 108 through the server_M 110 may each provide automated social network activity modes. The automated social network activity mode processing is based upon detection of user activities to provide user-specific content filtering across multiple content streams so the user is provided with content appropriate for the detected user activities, while delaying/deferring content that is unrelated to the detected user activities. As such, the present technology may be implemented at a user computing device or server device level. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device. One or more of the server_1 108 through the server_M 110 may provide social network functionality.

The database 112 may include a relational database, an object database, or any other storage type of device. As such, the database 112 may be implemented as appropriate for a given implementation.

Figure 2:
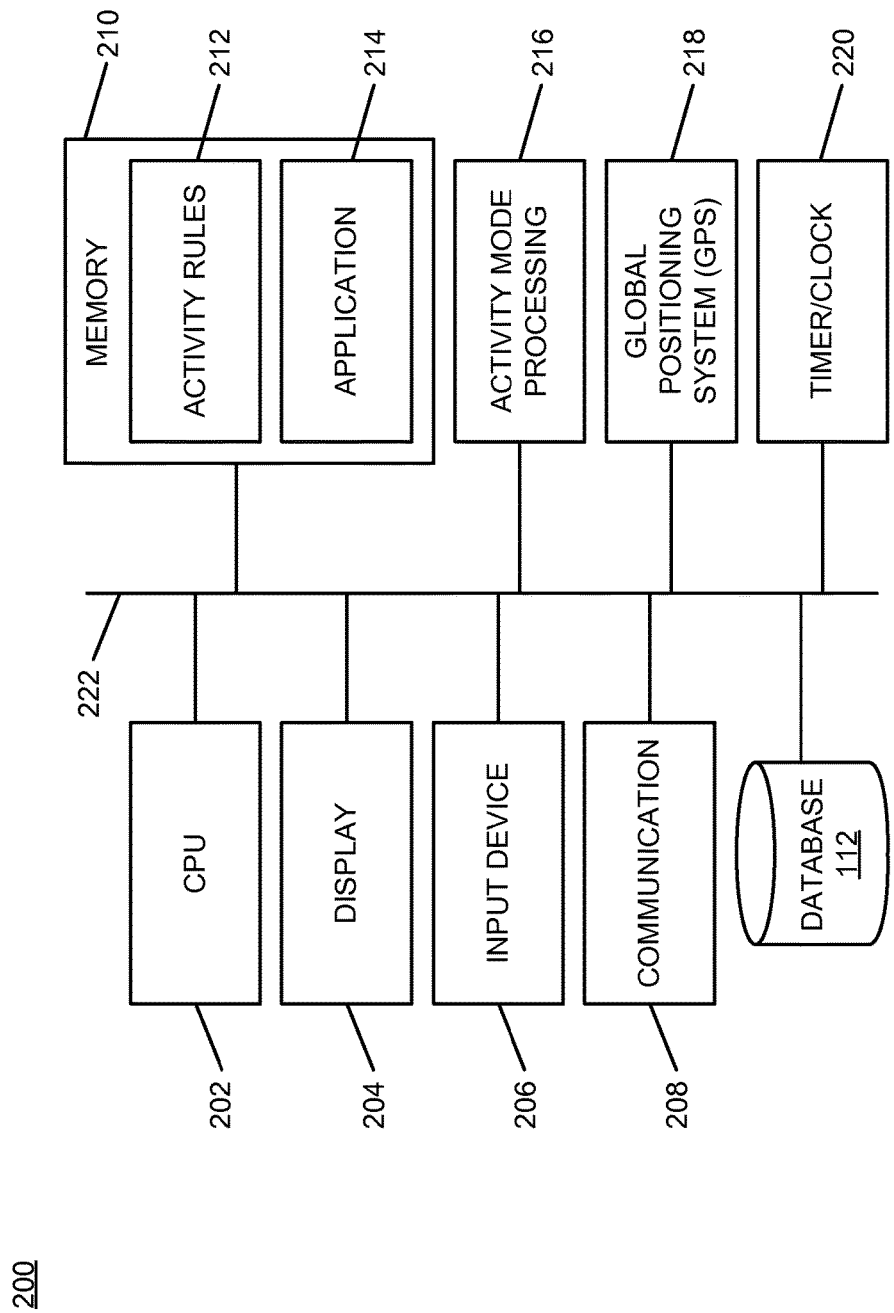
FIG. 2 is a block diagram of an example of an implementation of a core processing module capable of implementing social network activity modes according to an embodiment of the present subject matter.

FIG. 2 is a block diagram of an example of an implementation of a core processing module 200 capable of implementing social network activity modes. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of social network activity modes in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes an activity rules area 212 that provides processing and storage space for social network activity rules in association with the core processing module 200. As will be described in more detail below, the social network activity rules stored within the activity rules area 212 are used to implement the social network activity modes described herein.

The memory 210 also includes an application area 214 that provides storage and execution space for one or more applications. As such, a client-based or client-server portion of an application, such as a calendar application, a GPS application, or other applications, may be provided in association with the core processing module 200 and may be used to perform programmatic selection and activation of social network activity modes.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An activity mode processing module 216 is also illustrated. The activity mode processing module 216 provides activity rule configuration and processing capabilities for the core processing module 200, as described above and in more detail below. The activity mode processing module 216 implements the automated social network activity modes of the core processing module 200. As such, the activity mode processing module 216 implements an activity rules engine, as described above.

It should also be noted that the activity mode processing module 216 may form a portion of other circuitry described without departure from the scope of the present subject matter. Further, the activity mode processing module 216 may alternatively be implemented as an application stored within the memory 210. In such an implementation, the activity mode processing module 216 may include instructions executed by the CPU 202 for performing the functionality described herein. The CPU 202 may execute these instructions to provide the processing capabilities described above and in more detail below for the core processing module 200. The activity mode processing module 216 may form a portion of an interrupt service routine (ISR), a portion of an operating system, a portion of a browser application, or a portion of a separate application without departure from the scope of the present subject matter.

A global positioning system (GPS) module 218 provides positioning location coordinates usable for identifying physical locations (e.g., vacation locations, work locations, etc.) of the core processing module 200 where the core processing module 200 is integrated into, for example, a GPS-capable smartphone, or usable for receiving and processing physical locations where the core processing module 200 is integrated into a server device. As such, the GPS module 218 may be used by the activity mode processing module 216 to programmatically select and activate activity modes.

A timer/clock module 220 is illustrated and used to determine timing and date information, such as to identify relevant calendar entries for use in programmatic selection of activity modes, as described above and in more detail below. As such, the activity mode processing module 216 may utilize information derived from the timer/clock module 220 for information processing activities, such as processing of social network activity modes.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the activity mode processing module 216, the GPS module 218, the timer/clock module 220, and the database 112 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
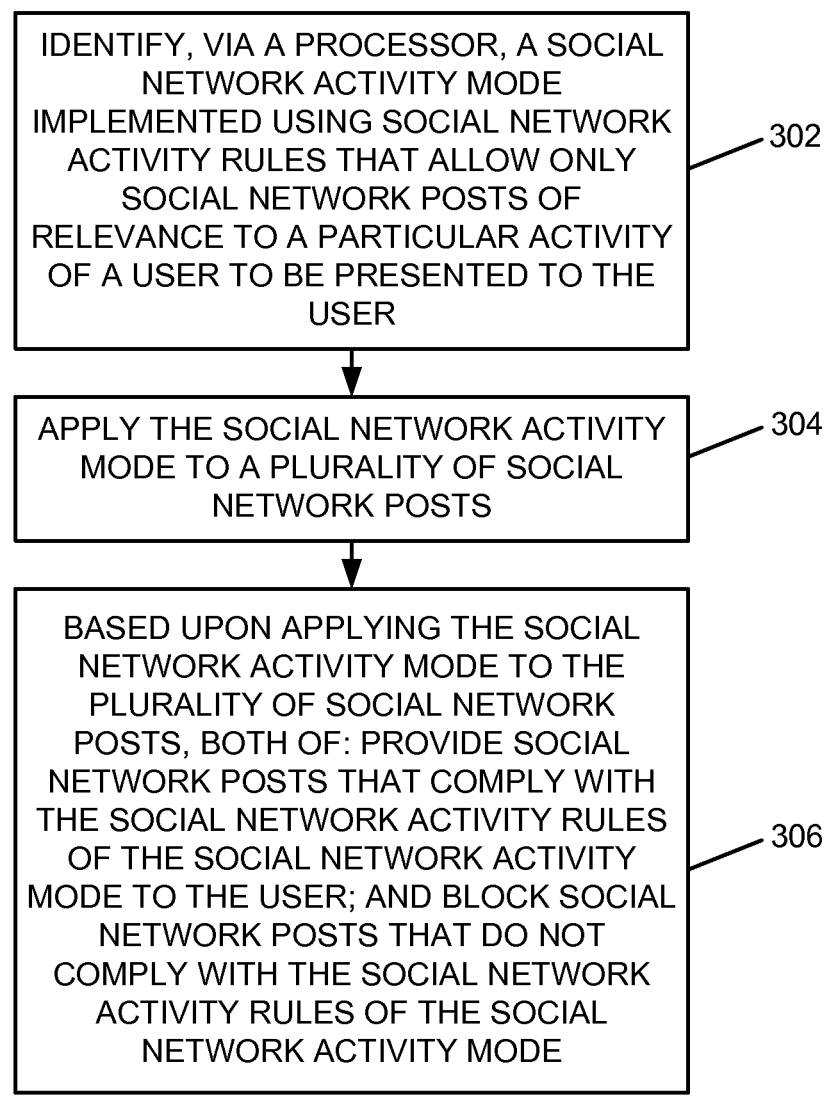
FIG. 3 is a flow chart of an example of an implementation of a process for social network activity modes according to an embodiment of the present subject matter.
Figure 4A:
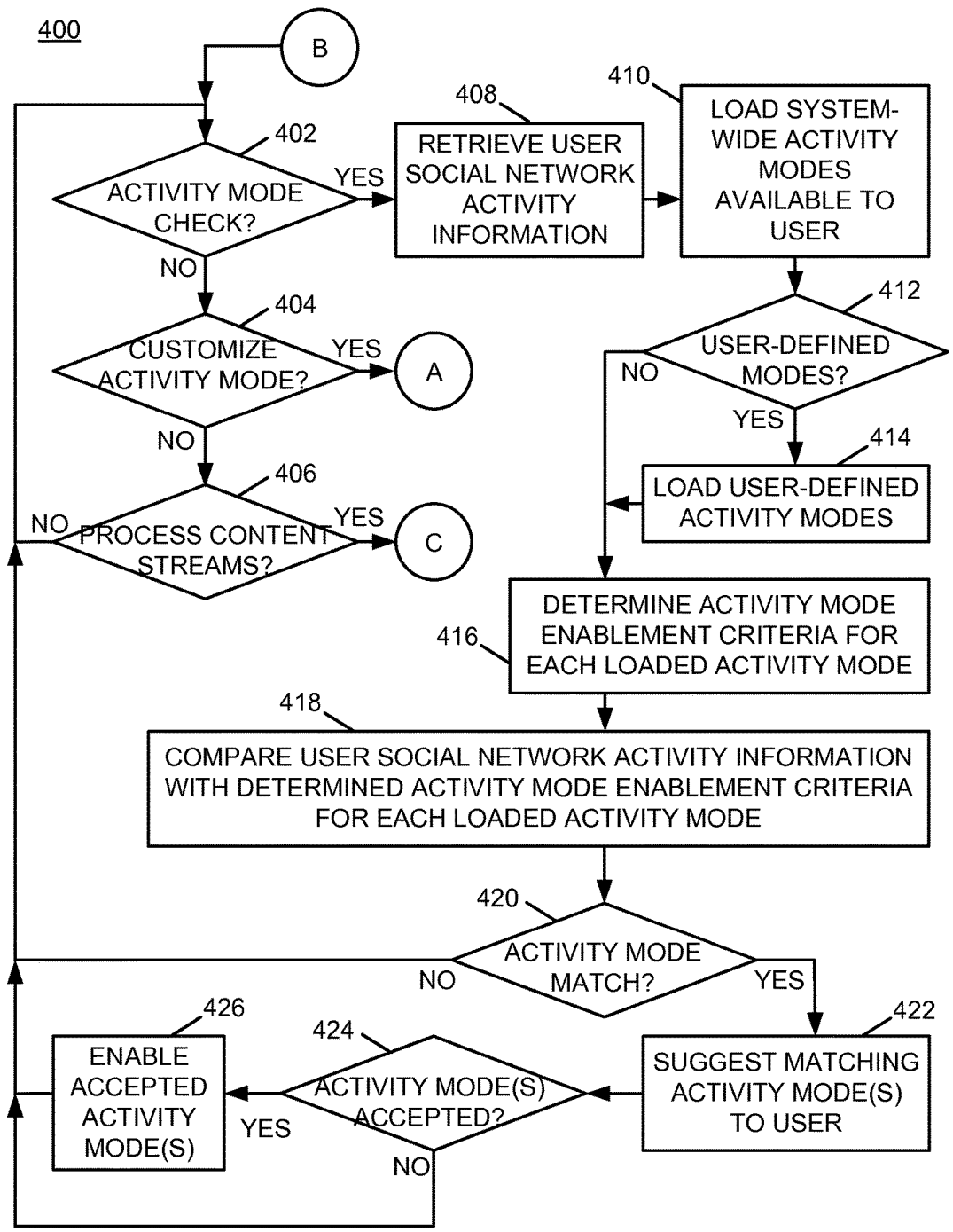
FIG. 4A is a flow chart of an example of an implementation of initial processing within a process for implementing system-wide and user-defined social network activity modes according to an embodiment of the present subject matter.
Figure 4B:
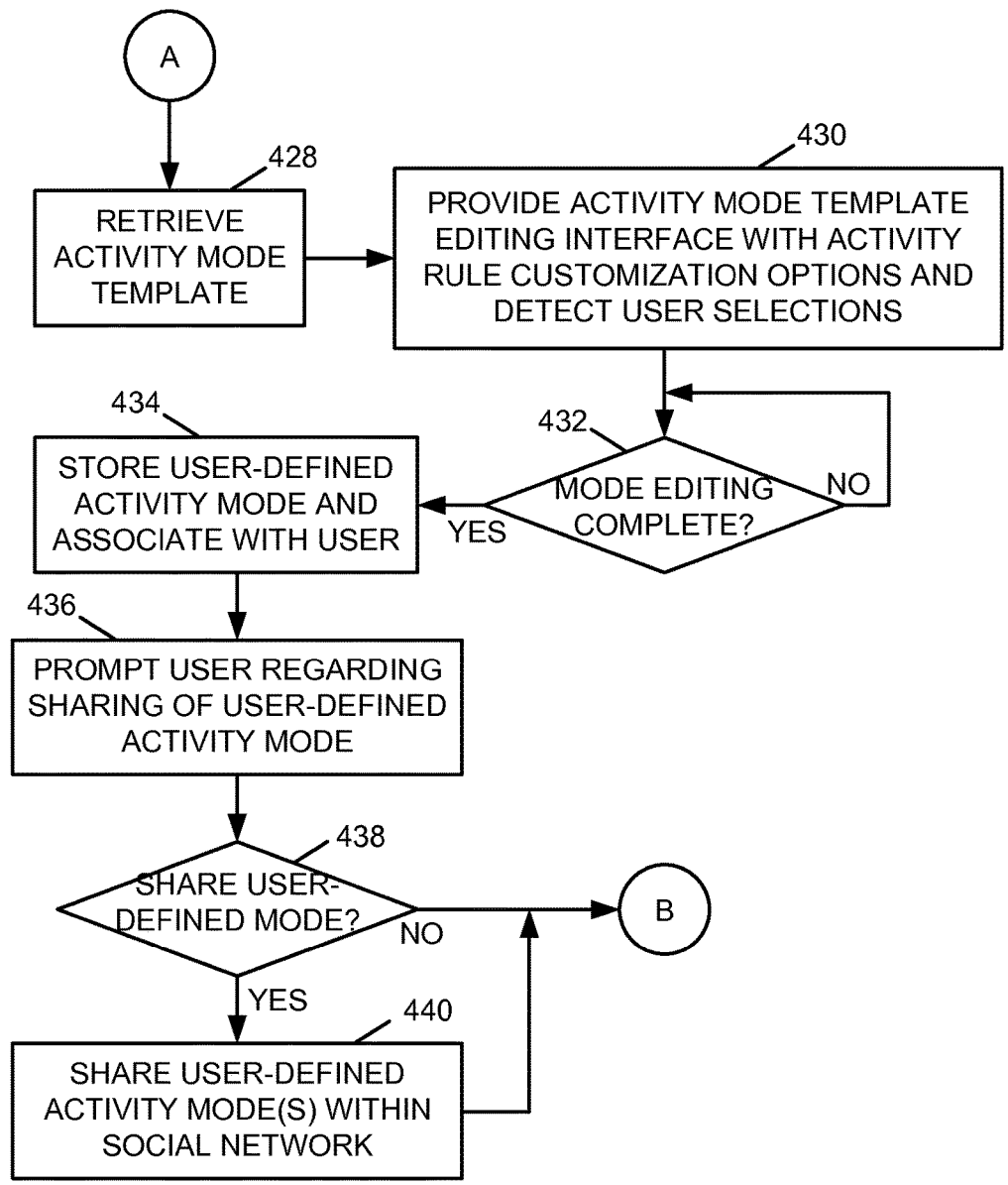
FIG. 4B is a flow chart of an example of an implementation of additional processing within a process for implementing system-wide and user-defined social network activity modes according to an embodiment of the present subject matter.
Figure 4C:
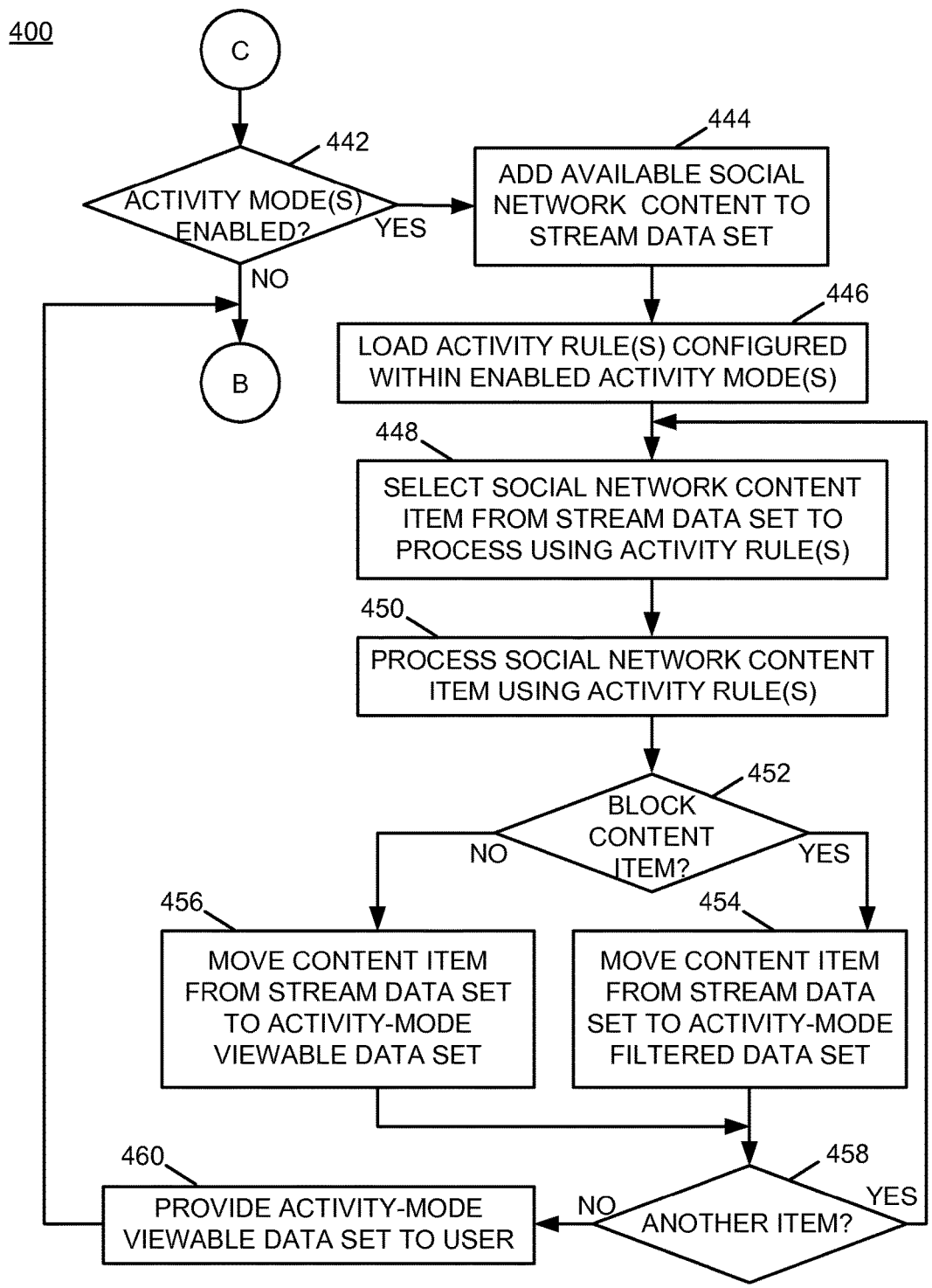
FIG. 4C is a flow chart of an example of an implementation of further additional processing within a process for implementing system-wide and user-defined social network activity modes according to an embodiment of the present subject matter.

FIG. 3 through FIG. 4C described below represent example processes that may be executed by devices, such as the core processing module 200, to perform the automated social network activity modes associated with the present subject matter. Many other variations on the example processes are possible and all are considered within the scope of the present subject matter. The example processes may be performed by modules, such as the activity mode processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for social network activity modes. At block 302, the process 300 identifies, via a processor, a social network activity mode implemented using social network activity rules that allow only social network posts of relevance to a particular activity of a user to be presented to the user. At block 304, the process 300 applies the social network activity mode to a plurality of social network posts. At block 306, based upon applying the social network activity mode to the plurality of social network posts, the process 300 both of: provides social network posts that comply with the social network activity rules of the social network activity mode to the user; and blocks social network posts that do not comply with the social network activity rules of the social network activity mode.

FIGS. 4A-4C illustrate a flow chart of an example of an implementation of a process 400 for implementing system-wide and user-defined social network activity modes. FIG. 4A illustrates initial processing within the process 400. The process 400 may be considered a per-user process that operates to suggest and activate system-wide and/or user-defined available social network activity modes. The process 400 may be initiated at a user login to a social network, or may be periodically or routinely initiated to perform the processing described below.

At decision point 402, the process 400 begins higher-level iterative processing by making a determination as to whether to perform an activity mode check to determine which social network activity mode(s) to suggest and/or activate for the respective social network user. Processing responsive to an affirmative determination at decision point 402 will be deferred and described in more detail below to continue the present description of the higher-level iterative processing within the process 400.

As such, in response to determining not to perform an activity mode check to determine which social network activity mode(s) to suggest and/or activate for the respective social network user at decision point 402, the process 400 makes a determination at decision point 404 as to whether a request from the user to customize an activity mode has been detected. As described above, activity mode templates may be provided and customized by a user. Alternatively, users may create activity mode processing rules by entry of activity rule syntax formatted for processing by the activity rules engine. Again, processing responsive to an affirmative determination at decision point 404 will be deferred and described in more detail below to continue the present description of the higher-level iterative processing within the process 400.

As such, in response to determining that a request from the user to customize an activity mode has not been detected at decision point 404, the process 400 makes a determination at decision point 406 as to whether to process content streams within the social network using social network activity modes. Processing of content streams within the social network using social network activity modes may be performed on a scheduled or routine basis, responsive to detection of a user opening or using an application (e.g., calendar, GPS, and email, etc.), responsive to detection of a user reading certain types of content within a social network, and responsive to other indicia as appropriate for a given implementation. Additionally, as described above, where a user is detected to be utilizing a particular application, a user is detected to be at a particular location (e.g., the beach), or a configured calendar entry is detected (e.g., business meeting), processing of social network content streams may be programmatically changed based upon changes to social network activity modes appropriate for the respective detected event. As with the other higher-level iterative determinations described above, processing responsive to an affirmative determination at decision point 406 will be deferred and described in more detail below to continue the present description of the higher-level iterative processing within the process 400.

In response to a determination at decision point 406 not to process content streams within the social network using social network activity modes, the process 400 returns to decision point 402 and iterates as described above. Returning to the description of decision point 402, in response to determining to perform an activity mode check to determine which social network activity mode(s) to suggest and/or activate for the respective social network user, the process 400 retrieves user social network activity information that specifies the user's social network activities at block 408. The user social network activity information may specify types of social network content the user is reading, types of communications, and other forms of user social network activities. The user social network activity information may be used to suggest and/or activate social network activity modes to process and filter social network content streams. At block 410, the process 400 loads any system-wide activity modes available to the user.

At block 412, the process 400 makes a determination as to whether any social network activity modes have been defined and configured by the user. In response to determining that at least one user-defined activity mode has been configured by the user, the process 400 loads the user-defined activity mode(s) at block 414. In response to loading the user-defined activity mode(s) at block 414, or in response to determining that there are no user-defined activity modes configured by the user at decision point 412, the process 400 determines activity mode enablement criteria for each loaded activity mode at block 416. The process 400 may determine under what circumstances the loaded activity modes are to be enabled/activated. For example, where a social network user spends a lot of time reading sports feeds, the process 400 may enable a "sports" activity mode. As such, the process 400 correlates activity modes and activity mode enablement criteria with a user's activities within a social network.

At block 418, the process 400 compares the user social network activity information with the determined activity mode enablement criteria for each loaded activity mode. At decision point 420, the process 400 makes a determination as to whether any activity mode match has been detected based upon the comparison of the user social network activity information with the determined activity mode enablement criteria for each loaded activity mode. An activity mode match may be based upon satisfaction of any of the activity mode enablement criteria for any loaded activity mode by the user's social network activities represented within the user social network activity information. In response to determining at decision point 420 that an activity mode match has not been detected, the process 400 returns to decision point 402 and iterates as described above.

In response to determining at decision point 420 that an activity mode match has been detected, the process 400 suggests one or more matching activity modes to the user at block 422. At decision point 424, the process 400 makes a determination as to whether the user has accepted any suggested activity mode(s).

In response to determining at decision point 424 that the user has accepted one or more suggested activity modes, the process 400 enables (activates) the accepted activity mode(s) at block 426. In response to enabling (activating) the accepted activity mode(s) at block 426, or in response to determining that the user has not accepted one or more suggested activity modes at decision point 424, the process 400 returns to decision point 402 and iterates as described above.

Returning to the description of decision point 404, in response to determining that a request from the user to customize an activity mode has been detected, the process 400 transitions to the processing shown and described in association with FIG. 4B.

FIG. 4B illustrates additional processing associated with the process 400 for implementing system-wide and user-defined social network activity modes. At block 428, the process 400 retrieves a configured activity mode template. At block 430, the process 400 provides an activity mode template editing user interface (UI) with activity rule customization options associated with the activity mode template to the user. The user may select values associated with the activity rule customization options to edit and finalize user-defined activity modes. The process 400 detects user selection of one or more activity rule customization options.

At decision point 432, the process 400 makes a determination as to whether activity mode editing has been completed, such as by entry of an indication from the user. In response to determining that activity mode editing has been completed, the process 400 stores the created user-defined activity mode and associates the user-defined activity mode with the user at block 434. The created user-defined activity mode may be stored, for example, within the database 112 or otherwise as appropriate for a given implementation.

At block 436, the process 400 prompts the user regarding sharing of a user-defined activity mode, including the created user-defined activity mode, within the social network. At decision point 438, the process 400 makes a determination as to whether the user has indicated to share the one or more user-defined defined activity modes within the social network. The indication to share one or more user-defined activity mode may be granular and may include an indication to share a particular user-defined activity mode with specific social network contacts or to share the user-defined activity mode by global publication within the social network. In response to determining that the user has indicated to share one or more user-defined defined activity modes within the social network, the process 400 shares the specified user-defined activity mode(s) within the social network at block 440 to make the user-defined activity mode available for loading and use by the specified other social network users (e.g., specific contacts or globally). In response to sharing the user-defined activity mode(s) within the social network as specified by the user at block 440, or in response to determining that the user has indicated not to share any user-defined defined activity modes within the social network at decision point 438, the process 400 returns to the processing described above in association with FIG. 4A at decision point 402 and iterates as described above.

Returning to the description of decision point 406 within FIG. 4A, in response to determining to process content streams within the social network using social network activity modes, the process 400 transitions to the processing shown and described in association with FIG. 4C.

FIG. 4C illustrates further additional processing associated with the process 400 for implementing system-wide and user-defined social network activity modes. At decision point 442, the process 400 makes a determination as to whether any activity modes are enabled for the respective user. For example, the process 400 may perform a database lookup, such as within the database 112, to retrieve social network user information that specifies enabled activity modes for the user. As described above, activity modes may be defined and selectively enabled to filter content based upon enabled activity modes. In response to determining that no activity modes are enabled for the respective user, the process 400 returns to the processing described above in association with FIG. 4A at decision point 402 and iterates as described above. As such, where no activity modes are enabled, the social network may process content normally (not shown).

Continuing with the description of decision point 442 within FIG. 4C, in response to determining that at least one activity mode is enabled for the respective user, the process 400 adds available social network content to a stream data set for the user at block 444. At block 446, the process 400 loads one or more activity rule(s) configured within the enabled activity mode(s). The process 400 may load the activity rule(s) configured within the enabled activity mode(s) from a database, such as the database 112.

At block 448, the process 400 selects a social network content item from the stream data set to process using the loaded activity rule(s). At block 450, the process 400 processes the social network content item using the activity rule(s). At decision point 452, the process 400 makes a determination as to whether to block (or deprioritize) the content item based upon the activity rule(s). In response to determining to block (or deprioritize) the content item based upon the activity rule(s), the process 400 moves the content item from the stream data set to an activity-mode filtered data set at block 454. As such, the process 400 may move the content item that does not comply with the activity rule(s) associated with the enabled activity mode(s) to a filtered data set. In this way, the process 400 blocks (or deprioritizes) and/or delays presentation of social network content items that are within the activity-mode filtered data set, and may present to the user at a later time the social network content items stored within the filtered data set, such as responsive to detecting a request from the user to view the delayed/filtered data set. Alternatively, for a deprioritized implementation, the social network content items that are within the activity-mode filtered data set may be presented in a lower location on a post viewing page. The activity-mode filtered data set may be stored for a configurable amount of time, or until the user views or otherwise deletes the posts from their content stream.

In response to determining at decision point 452 not to block (or deprioritize) the content item based upon the activity rule(s), the process 400 moves the content item from the stream data set to an activity-mode viewable data set at block 456. As such, the process 400 may add the content item that complies with the activity rule(s) associated with the enabled activity mode(s) to a viewable data set that may be provided to the user for viewing while the respective activity mode(s) are enabled.

In response to moving the content item either to the activity-mode filtered data set at block 454 or to the activity-mode viewable data set at block 456, the process 400 makes a determination as to whether there is another content item remaining in the stream data set at decision point 458. In response to determining that there is another content item remaining in the stream data set, the process 400 returns to block 448 and iterates as described above. In response to determining that no other content items remain in the stream data set, the process 400 provides the activity-mode viewable data set to the user at block 460. The process 400 returns to the processing described above in association with FIG. 4A at decision point 402 and iterates as described above.

As such, the process 400 analyzes activities of a social network user and makes suggestions of social network activity modes that may be of interest to a social network user. The process 400 also allows users to create user-defined activity modes by creating activity rules that filter content during user-specified activities. The process 400 additionally processes social network content streams using one or more activity modes defined for a particular user that are selected based upon the user's current activities.

As described above in association with FIG. 1 through FIG. 4C, the example systems and processes provide social network activity modes. Many other variations and additional activities associated with social network activity modes are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method that improves remote user content control of activity stream formation operation(s) performed by a social networking server from posts generated by a plurality of different content sources, comprising:

by a processor of the social networking server:

providing a programmatic server-level activity rule engine editing interface that allows a user to control, from a remote user computing device, how the social networking server forms an activity stream to categorically include or exclude subsets of the posts generated by each of the plurality of different content sources according to different categories of activities engaged in by the user, where the programmatic server-level activity rule engine editing interface allows the user to define a server-level user activity-based content delivery mode that controls the activity stream formation operation(s) performed by the social networking server according to user-specified user activity rules that each (i) specify a category of user activity of the user detectable from the social networking server while the user is using the remote user computing device, and (ii) comprise server controls that cause the social networking server to form, during the detected category of user activity of the user while the user is using the remote user computing device, the activity stream using only social network posts generated by each of the plurality of different types of content sources that include content that categorically matches the user-specified category of user activity of the user;

activating, responsive to detecting from the social networking server that the user is using the remote user computing device according to the user-specified category of user activity, the user-defined server-level user activity-based content delivery mode of the social networking server;

based upon activating the user-defined server-level user activity-based content delivery mode of the social networking server, both of:
forming, using the user-specified user activity rules of the user-defined server-level user activity-based content delivery mode, the activity stream using only the social network posts generated by each of the plurality of different types of content sources that include the content that categorically matches the user-specified category of user activity; and
forming a blocked activity-mode data set that comprises any of the social network posts that do not include the content that categorically matches the user-specified category of user activity; and
further comprising the processor both:
delivering, to the remote user computing device, the activity stream formed from only the social network posts generated by each of the plurality of different types of content sources that include the content that categorically matches the user-specified category of user activity; and
deleting the blocked activity-mode data set after a configured amount of time has passed from delivering the activity stream to the remote user computing device.

2. The method of claim 1, where:
the user-specified category of user activity of the user detected by the social networking server while the user is using the remote user computing device comprises one or more of (i) the user opening one or more specified applications on the remote user computing device, (ii) the user using the one or more specified applications on the remote user computing device, (iii) the user reading a specified type of content via the remote user computing device within a social network hosted by the social networking server, (iv) the remote user computer device being located at a particular location, and (v) a current configured calendar entry within a calendar application of the remote user computing device;
the categories of activities engaged in by the user are selected from a group consisting of vacation activities, work activities, personal activities, social activities, age-group related activities, and optimistic activities; and
further comprising the processor:
detecting, prior to the configured amount of time having passed from delivering the activity stream to the remote user computing device, a request from the user to view the social network posts of the blocked activity-mode data set; and
delivering the social network posts of the blocked activity-mode data set to the user.

3. The method of claim 1, where:
detecting from the social networking server that the user is using the remote user computing device according to the user-specified category of user activity comprises the processor:
retrieving user social network activity information that specifies one or more of the user's current activities via the remote user computing device within a social network hosted by the social networking server; and
further comprising the processor:
correlating the retrieved user social network activity information with additional server-level user activity-based content delivery modes defined at the social networking server and a social network content delivery server mode enablement criterion configured to activate each additional server-level user activity-based content delivery mode;
determining, from the correlation based upon at least one of the user's current activities, that an individual user activity-based content delivery mode match has been detected for the user with at least one of the additional user activity-based content delivery modes; and
activating each matching additional server-level user activity-based content delivery mode at the social networking server to further enhance individualized delivery of social networking content from the social networking server to the user.

4. The method of claim 1, further comprising the processor:
loading system-wide server-level user activity-based content delivery modes available to the user;
loading at least one additional user-defined server-level user activity-based content delivery mode available to the user;
determining a social network content delivery server mode enablement criterion configured to activate each loaded server-level user activity-based content delivery mode;
comparing current user activity information of the user via the remote user computing device with the social network content delivery server mode enablement criterion configured to activate each loaded server-level user activity-based content delivery mode; and
selecting at least one of the system-wide server-level user activity-based content delivery modes and the additional user-defined server-level user activity-based content delivery modes to suggest to the user.

5. The method of claim 1, further comprising the processor:
suggesting at least one additional server-level user activity-based content delivery mode to the user determined to match current user non-social network activity information of the user derived from detection of the user's current use of the remote user computing device and that specifies one of the user's current location or the user's current non-social network activities;
determining that the user has accepted the at least one suggested additional server-level user activity-based content delivery mode; and
activating each accepted additional server-level user activity-based content delivery mode at the social networking server to enhance individualized delivery of social networking content from the social networking server to the user.

6. The method of claim 1, where the processor providing the programmatic server-level activity rule engine editing interface comprises the processor:
detecting a request from the user to create the user-defined server-level user activity-based content delivery mode to be implemented by the social networking server;
providing a server-level user activity-based content delivery server mode template editing user interface as part of the programmatic server-level activity rule engine editing interface that comprises user activity-based content delivery server rule customization options associated with a server-level user activity-based content delivery server mode template to the user;
detecting user selection of at least one user activity-based content delivery server rule customization option;

storing the server-level user activity-based content delivery server mode template with the user-selected at least one user activity-based content delivery server rule customization option as the user-defined server-level user activity-based content delivery mode implemented by the social networking server; and associating the user-defined server-level user activity-based content delivery mode with the user within a social network provided by the social networking server to enhance individualized delivery of social networking content to the user.

7. The method of claim 1, further comprising the processor:

prompting the user regarding sharing of the user-defined server-level user activity-based content delivery mode within a social network provided by the social networking server;

detecting a user indication to share the user-defined server-level user activity-based content delivery mode with at least one other social network user; and sharing the user-defined server-level user activity-based content delivery mode with the at least one other social network user via the social network to allow the at least one other social network user to achieve individualized user-controlled user activity-based delivery of social networking content from the social networking server to the at least one other social network user.

8. A system that improves remote user content control of activity stream formation operation(s) performed by a social networking server from posts generated by a plurality of different content sources, comprising:

a communication interface; and a processor of the social networking server programmed to:

provide, via the communication interface, a programmatic server-level activity rule engine editing interface that allows a user to control, from a remote user computing device, how the social networking server forms an activity stream to categorically include or exclude subsets of the posts generated by each of the plurality of different content sources according to different categories of activities engaged in by the user, where the programmatic server-level activity rule engine editing interface allows the user to define a server-level user activity-based content delivery mode that controls the activity stream formation operation(s) performed by the social networking server according to user-specified user activity rules that each (i) specify a category of user activity of the user detectable from the social networking server while the user is using the remote user computing device, and (ii) comprise server controls that cause the social networking server to form, during the detected category of user activity of the user while the user is using the remote user computing device, the activity stream using only social network posts generated by each of the plurality of different types of content sources that include content that categorically matches the user-specified category of user activity of the user;

activate, responsive to detecting from the social networking server that the user is using the remote user computing device according to the user-specified category of user activity, the user-defined server-level user activity-based content delivery mode of the social networking server; and based upon activating the user-defined server-level user activity-based content delivery mode of the social networking server, both of:

form, using the user-specified user activity rules of the user-defined server-level user activity-based content delivery mode, the activity stream using only the social network posts generated by each of the plurality of different types of content sources that include the content that categorically matches the user-specified category of user activity; and form a blocked activity-mode data set that comprises any of the social network posts that do not include the content that categorically matches the user-specified category of user activity; and where the processor is further programmed to both:

deliver, to the remote user computing device, the activity stream formed from only the social network posts generated by each of the plurality of different types of content sources that include the content that categorically matches the user-specified category of user activity; and delete the blocked activity-mode data set after a configured amount of time has passed from delivering the activity stream to the remote user computing device.

9. The system of claim 8, where:

the user-specified category of user activity of the user detected by the social networking server while the user is using the remote user computing device comprises one or more of (i) the user opening one or more specified applications on the remote user computing device, (ii) the user using the one or more specified applications on the remote user computing device, (iii) the user reading a specified type of content via the remote user computing device within a social network hosted by the social networking server, (iv) the remote user computer device being located at a particular location, and (v) a current configured calendar entry within a calendar application of the remote user computing device;

the categories of activities engaged in by the user are selected from a group consisting of vacation activities, work activities, personal activities, social activities, age-group related activities, and optimistic activities; and the processor is further programmed to:

detect, prior to the configured amount of time having passed from delivering the activity stream to the remote user computing device, a request from the user to view the social network posts of the blocked activity-mode data set; and deliver the social network posts of the blocked activity-mode data set to the user.

10. The system of claim 8, where:

in being programmed to detect from the social networking server that the user is using the remote user computing device according to the user-specified category of user activity, the processor is programmed to:

retrieve user social network activity information that specifies one or more of the user's current activities via the remote user computing device within a social network hosted by the social networking server; and where the processor is further programmed to:

correlate the retrieved user social network activity information with additional server-level user activity-based content delivery modes defined at the social networking server and a social network content delivery server mode enablement criterion configured to activate each additional server-level user activity-based content delivery mode;

determine, from the correlation based upon at least one of the user's current activities, that an individual user activity-based content delivery mode match has been detected for the user with at least one of the additional user activity-based content delivery modes; and activate each matching additional server-level user activity-based content delivery mode at the social networking server to further enhance individualized delivery of social networking content from the social networking server to the user.

11. The system of claim 8, where the processor is further programmed to:

load system-wide server-level user activity-based content delivery modes available to the user;

load at least one additional user-defined server-level user activity-based content delivery mode available to the user;

determine a social network content delivery server mode enablement criterion configured to activate each loaded server-level user activity-based content delivery mode;

compare current user activity information of the user via the remote user computing device with the social network content delivery server mode enablement criterion configured to activate each loaded server-level user activity-based content delivery mode; and select at least one of the system-wide server-level user activity-based content delivery modes and the additional user-defined server-level user activity-based content delivery modes to suggest to the user.

12. The system of claim 8, further comprising a memory, and where, in being programmed to provide the programmatic server-level activity rule engine editing interface comprises, the processor is programmed to:

detect a request from the user to create the user-defined server-level user activity-based content delivery mode to be implemented by the social networking server;

provide a server-level user activity-based content delivery server mode template editing user interface as part of the programmatic server-level activity rule engine editing interface that comprises user activity-based content delivery server rule customization options associated with a server-level user activity-based content delivery server mode template to the user;

detect user selection of at least one user activity-based content delivery server rule customization option;

store, within the memory, the server-level user activity-based content delivery server mode template with the user-selected at least one user activity-based content delivery server rule customization option as the user-defined server-level user activity-based content delivery mode implemented by the social networking server; and associate the user-defined server-level user activity-based content delivery mode with the user within a social network provided by the social networking server to enhance individualized delivery of social networking content to the user.

13. The system of claim 8, where the processor is further programmed to:

prompt the user regarding sharing of the user-defined server-level user activity-based content delivery mode within a social network provided by the social networking server;

detect a user indication to share the user-defined server-level user activity-based content delivery mode with at least one other social network user; and share the user-defined server-level user activity-based content delivery mode with the at least one other social network user via the social network to allow the at least one other social network user to achieve individualized user-controlled user activity-based delivery of social networking content from the social networking server to the at least one other social network user.

14. A computer program product that improves remote user content control of activity stream formation by a social networking server from posts generated by a plurality of different content sources, comprising:

a computer readable storage medium having computer readable program code embodied therewith, where the computer readable program code when executed on a computer of the social networking server causes the computer to:

provide a programmatic server-level activity rule engine editing interface that allows a user to control, from a remote user computing device, how the social networking server forms an activity stream to categorically include or exclude subsets of the posts generated by each of the plurality of different content sources according to categories of activities engaged in by the user, where the programmatic server-level activity rule engine editing interface allows the user to define a server-level user activity-based content delivery mode that controls the activity stream formation operation(s) performed by the social networking server according to user-specified user activity rules that each (i) specify a category of user activity of the user detectable from the social networking server while the user is using the remote user computing device, and (ii) comprise server controls that cause the social networking server to form, during the detected category of user activity of the user while the user is using the remote user computing device, the activity stream using only social network posts generated by each of the plurality of different types of content sources that include content that categorically matches the user-specified category of user activity of the user;

activate, responsive to detecting from the social networking server that the user is using the remote user computing device according to the user-specified category of user activity, the user-defined server-level user activity-based content delivery mode of the social networking server;

based upon activating the user-defined server-level user activity-based content delivery mode of the social networking server, both of:

form, using the user-specified user activity rules of the user-defined server-level user activity-based content delivery mode, the activity stream using only the social network posts generated by each of the plurality of different types of content sources that include the content that categorically matches the user-specified category of user activity; and form a blocked activity-mode data set that comprises any of the social network posts that do not include the content that categorically matches the user-specified category of user activity; and where the computer readable program code when executed on the computer further causes the computer to both:

deliver, to the remote user computing device, the activity stream formed from only the social network posts generated by each of the plurality of different types of content sources that include the content that categorically matches the user-specified category of user activity; and delete the blocked activity-mode data set after a configured amount of time has passed from delivering the activity stream to the remote user computing device.

15. The computer program product of claim 14, where:

the user-specified category of user activity of the user detected by the social networking server while the user is using the remote user computing device comprises one or more of (i) the user opening one or more specified applications on the remote user computing device, (ii) the user using the one or more specified applications on the remote user computing device, (iii) the user reading a specified type of content via the remote user computing device within a social network hosted by the social networking server, (iv) the remote user computer device being located at a particular location, and (v) a current configured calendar entry within a calendar application of the remote user computing device;

the categories of activities engaged in by the user are selected from a group consisting of vacation activities, work activities, personal activities, social activities, age-group related activities, and optimistic activities; and the computer readable program code when executed on the computer further causes the computer to:

detect, prior to the configured amount of time having passed from delivering the activity stream to the remote user computing device, a request from the user to view the social network posts of the blocked activity-mode data set; and deliver the social network posts of the blocked activity-mode data set to the user.

16. The computer program product of claim 14, where:

in causing the computer to detect from the social networking server that the user is using the remote user computing device according to the user-specified category of user activity, the computer readable program code when executed on the computer causes the computer to:

retrieve user social network activity information that specifies one or more of the user's current activities via the remote user computing device within a social network hosted by the social networking server; and where the computer readable program code when executed on the computer further causes the computer to:

correlate the retrieved user social network activity information with additional server-level user activity-based content delivery modes defined at the social networking server and a social network content delivery server mode enablement criterion configured to activate each additional server-level user activity-based content delivery mode;

determine, from the correlation based upon at least one of the user's current activities, that an individual user activity-based content delivery mode match has been detected for the user with at least one of the additional user activity-based content delivery modes; and activate each matching additional server-level user activity-based content delivery mode at the social networking server to further enhance individualized delivery of social networking content from the social networking server to the user.

17. The computer program product of claim 14, where the computer readable program code when executed on the computer further causes the computer to:

load system-wide server-level user activity-based content delivery modes available to the user;

load at least one additional user-defined server-level user activity-based content delivery mode available to the user;

determine a social network content delivery server mode enablement criterion configured to activate each loaded server-level user activity-based content delivery mode;

compare current user activity information of the user via the remote user computing device with the social network content delivery server mode enablement criterion configured to activate each loaded server-level user activity-based content delivery mode; and select at least one of the system-wide server-level user activity-based content delivery modes and the additional user-defined server-level user activity-based content delivery modes to suggest to the user.

18. The computer program product of claim 14, where the computer readable program code when executed on the computer further causes the computer to:

suggest at least one additional server-level user activity-based content delivery mode to the user determined to match current user non-social network activity information of the user derived from detection of the user's current use of the remote user computing device and that specifies one of the user's current location or the user's current non-social network activities;

determine that the user has accepted the at least one suggested additional server-level user activity-based content delivery mode; and activate each accepted additional server-level user activity-based content delivery mode at the social networking server to enhance individualized delivery of social networking content from the social networking server to the user.

19. The computer program product of claim 14, where, in causing the computer to provide the programmatic server-level activity rule engine editing interface, the computer readable program code when executed on the computer causes the computer to:

detect a request from the user to create the user-defined server-level user activity-based content delivery mode to be implemented by the social networking server;

provide a server-level user activity-based content delivery server mode template editing user interface as part of the programmatic server-level activity rule engine editing interface that comprises user activity-based content delivery server rule customization options associated with a server-level user activity-based content delivery server mode template to the user;

detect user selection of at least one user activity-based content delivery server rule customization option;

store the server-level user activity-based content delivery server mode template with the user-selected at least one user activity-based content delivery server rule customization option as the user-defined server-level user activity-based content delivery mode implemented by the social networking server; and associate the server-level user-defined user activity-based content delivery mode with the user within a social network provided by the social networking server to enhance individualized delivery of social networking content to the user.

20. The computer program product of claim 14, where the computer readable program code when executed on the computer further causes the computer to:
prompt the user regarding sharing of the user-defined server-level user activity-based content delivery mode within a social network provided by the social networking server;
detect a user indication to share the user-defined server-level user activity-based content delivery mode with at least one other social network user; and
share the user-defined server-level user activity-based content delivery mode with the at least one other social network user via the social network to allow the at least one other social network user to achieve individualized user-controlled user activity-based delivery of social networking content from the social networking server to the at least one other social network user.

\* \* \* \* \*